United States Patent [19]
Horie et al.

[11] 4,382,914
[45] May 10, 1983

[54] PROCESS FOR PREPARING CYCLIC PHOSPHONITRILIC CHLORIDE OLIGOMERS

[75] Inventors: Kiyoshi Horie, Takasago; Yoshiaki Morita, Itami; Yukio Mikamori, Kobe; Masaharu Suzuki, Takatsuki; Susumu Yano, Takasago, all of Japan

[73] Assignee: Nippon Fine Chemical Company, Ltd., Japan

[21] Appl. No.: 244,231

[22] Filed: Mar. 16, 1981

[30] Foreign Application Priority Data

Jun. 11, 1980 [JP] Japan ................................... 55-79291
Oct. 31, 1980 [JP] Japan ................................. 55-154073

[51] Int. Cl.³ ............................................. C01B 25/10
[52] U.S. Cl. ..................................................... 423/300
[58] Field of Search ........................................... 423/300

[56] References Cited

U.S. PATENT DOCUMENTS

| | | |
|---|---|---|
| 3,669,633 | 6/1972 | Beinfest et al. ...................... 423/300 |
| 4,046,857 | 9/1977 | Fekete et al. ........................ 423/300 |
| 4,139,598 | 2/1979 | Reynard et al. ..................... 423/300 |
| 4,226,840 | 10/1980 | Fieldhouse et al. ................ 423/300 |
| 4,256,715 | 3/1981 | Kinoshita et al. .................... 423/300 |
| 4,259,305 | 3/1981 | Anderson ............................. 423/300 |
| 4,272,382 | 6/1981 | Ogata et al. .......................... 423/300 |

Primary Examiner—O. R. Vertiz
Assistant Examiner—Wayne A. Langel
Attorney, Agent, or Firm—Larson and Taylor

[57] ABSTRACT

This invention provides a process for preparing cyclic phosphonitrilic chloride oligomers characterized by the combination of:

(I) The first step of reacting phosphorus pentachloride with ammonium chloride in an inert organic solvent in the presence of a catalyst comprising at least one of (a) chlorides of bivalent metals and (b) organic acid salts of bivalent metals, and distilling off the solvent from the resulting reaction mixture to obtain a reaction product consisting essentially of cyclic phosphonitrilic chloride oligomers, and (II) the second step of contacting a solution of the reaction product in at least one solvent selected from the group consisting of aliphatic hydrocarbons and ethers with water at a temperature of about 40° to about 100° C., separating the resulting aqueous layer from the organic layer, and isolating from the organic layer a mixture of cyclic phosphonitrilic chloride oligomers having outstanding polymerization properties and consisting essentially of the trimer and tetramer of the phosphonitrilic chloride.

34 Claims, No Drawings

PROCESS FOR PREPARING CYCLIC PHOSPHONITRILIC CHLORIDE OLIGOMERS

This invention relates to a process for preparing cyclic phosphonitrilic chloride oligomers.

Cyclic phosphonitrilic chloride oligomers, represented by the formula $(PNCl_2)_n$ wherein n is an integer of about 3 to about 7, have attracted attention as materials for preparing phosphazene polymers which are inorganic high-molecular-weight compounds. Phosphazene polymers are produced by subjecting a cyclic phosphonitrilic chloride oligomer, especially the trimer thereof (hexachlorocyclotriphosphazene), to ring-opening polymerization to obtain a chained polydichlorophosphazene, and replacing the chlorine thereof by various substituents. Use of different substituents is expected to afford various phosphazene polymers with a wide variety of properties, such as flame retardancy, water repellency, elasticity at low temperatures, resistance to chemicals, electrical insulating properties, affinity for living bodies, etc. Such polymers are recently under intensive investigation for their application to elastomers, coating compositions and foamed bodies which have these properties.

Cyclic phosphonitrilic chloride oligomers (hereinafter referred to simply as "PNC oligomers") have been actively produced for use as materials for phosphazene polymers with the above desirable properties. However, the polymerization of the PNC oligomers prepared by the known processes involves drawbacks, such as coloring of the resulting polymer, formation of gel within a very short time, low degrees of polymerization or a wide molecular weight distribution, etc. Thus none of the conventional processes give oligomers having satisfactory polymerization properties. Another characteristic drawback of the known processes is that the PNC oligomers obtained do not always give phosphazene polymers having definite properties, with extreme difficulties encountered in affording a polymer of specific properties with good reproducibility.

Accordingly research is also underway on processes in which crude PNC oligomers are purified to assure improved polymerization properties. The purifying steps of the processes already proposed, nevertheless, involve very great losses of PNC oligomers and still have the drawback that even with the use of such purified PNC oligomers, polymers are not available with satisfactory properties, or with definite properties which are highly reproducible. U.S. Pat. No. 3,669,633, for example, discloses a process comprising the steps of reacting ammonium chloride with $PCl_5$ in an organic solvent inert to the reaction such as monochlorobenzene, washing the resultant reaction mixture in the organic solvent at a temperature of 75° to 100° C. with water, separating the aqueous phase from the organic solvent phase, and obtaining PNC oligomers from the organic solvent phase. With this process, however, the aqueous phase is not efficiently separable from the organic phase, so that the process merely achieves PNC oligomer recovery ratio of as low as 86%. Additionally, the polymers prepared from the product become seriously discolored or undergo gelation within a very short time and are not reproducible in properties. U.S. Pat. No. 3,694,171 discloses a purifying process which, like the process of the above U.S. patent, is low in oligomer recovery ratio and unable to prepare PNC oligomers which afford polymers of reproducible satisfactory properties. With this process, a reaction mixture comprising PNC oligomers and an organic solvent inert to chlorination is brought into contact with an aqueous solution of sodium hydroxide or the like to obtain PNC oligomers which are essentially comprised of trimer and tetramer, but the process only achieves a low PNC oligomer recovery ratio of about 60% and involves very great losses of PNC oligomers. Published Unexamined Japanese Patent Application No.142195/1979 discloses a process in which crude PNC oligomers are washed with water at least twice at room temperature, but the PNC oligomer recovery ratio is also as low as 63.5%. Moreover the polymers obtained from the oligomers do not have satisfactory definite properties which are reproducible. It is therefore difficult to always obtain polymers of specified quality.

An object of the present invention is to provide a process for preparing PNC oligomers having outstanding polymerization properties and therefore capable of giving phosphazene polymers with excellent properties, such as high degrees of polymerization and narrow molecular weight distribution, without entailing discoloring and without substantially permitting formation of gel.

Another object of the invention is to provide a process for preparing PNC oligomers capable of reproducibly giving phosphazene polymers with excellent properties.

Another object of the invention is to provide a process for preparing PNC oligomers including a purifying step by which the PNC oligomers can be recovered at a ratio of nearly 100% almost without any losses of oligomers.

These objects and other features of this invention will become apparent from the following description.

The present invention provides a process for preparing cyclic phosphonitrilic chloride oligomers characterized by the combination of:

(I) the first step of reacting phosphorus pentachloride with ammonium chloride in an inert organic solvent in the presence of a catalyst comprising at least one of (a) chlorides of bivalent metals and (b) organic acid salts of bivalent metals, and distilling off the solvent from the resulting reaction mixture to obtain a reaction product consisting essentially of cyclic phosphonitrilic chloride oligomers, and (II) the second step of contacting a solution of the reaction product in at least one solvent selected from among aliphatic hydrocarbons and ethers with water at a temperature of about 40° to about 100° C., separating the resulting aqueous layer from the organic layer, and isolating from the organic layer a mixture of cyclic phosphonitrilic chloride oligomers having outstanding polymerization properties and consisting essentially of the trimer and tetramer of the phosphonitrilic chloride.

Our research has revealed the following. When phosphorus pentachloride and ammonium chloride are reacted with use of the above-specified catalyst and the solvent is removed from the reaction mixture in the first step, a high yield of reaction product is obtained which consists essentially of cyclic phosphonitrilic chloride oligomers (PNC oligomers) and which is substantially free from linear phosphazene oligomers and other impurities. Further when the second step is performed by contacting a solution of the reaction product in a specified solvent with water at a specified temperature and separating the organic layer from the resulting aqueous layer, the desired oligomers can be recovered almost 100% with little or no loss, unlike the conventional processes. By further purifying the crude PNC oligomers thus recovered, purified PNC oligomers are isolated which have outstanding polymerization properties and consist essentially of the trimer and tetramer of phosphonitrilic chloride. The PNC oligomers can be polymerized without entailing any discoloring or formation of gel, giving polymer having high degrees of polymerization and a narrow molecular weight distribution with good reproducibility.

To achieve the foregoing outstanding result according to this invention, it is critical to perform (i) the first step in which the reaction is conducted in the presence of a specified catalyst, in combination with (ii) the second step in which a solution of the resulting reaction product in a specified solvent is contacted with water. The desired result is not attainable, for example, when the reaction of the first step is conducted in the absence of the specified catalyst or in the presence of a catalyst other than the above-specified catalyst, followed by the second step, or when the reaction product resulting from the first step is dissolved in a solvent other than those specified for the second step, or when the solution of the second step is not contacted with water.

The inert organic solvents useful for the first step of this invention are straight-chain or branched-chain chlorinated hydrocarbons having about 2 to about 4 carbon atoms, chlorobenzenes, etc. Examples of such chlorinated hydrocarbon are tetrachloroethane, tetrachloroethylene, etc. Examples of useful chlorobenzenes are monochlorobenzene, dichlorobenzene, trichlorobenzene, etc.

The catalyst to be used in this invention are (a) chlorides of bivalent metals, and (b) organic acid salts of bivalent metals. These catalysts (a) and (b) are usable singly, or at least two of them are usable in combination. Typical of such catalysts are given below.

(a) Chlorides of bivalent metals

Chlorides of metals in Group II of the Periodic Table, such as $BeCl_2$, $MgCl_2$, $CaCl_2$, $SrCl_2$, $BaCl_2$, $ZnCl_2$, $CdCl_2$, etc.
Chlorides of metals in Group III, such as $GaCl_2$, etc.
Chlorides of metals in Group IV, such as $TiCl_2$, $SnCl_2$, $PbCl_2$, etc.
Chlorides of metals in Group V, such as $VCl_2$, $NbCl_2$, etc.
Chlorides of metals in Group VI, such as $CrCl_2$, $MoCl_2$, etc.
Chlorides of metals in Group VII, such as $MnCl_2$, etc.
Chlorides of metals in Group VIII, such as $FeCl_2$, $CoCl_2$, $NiCl_2$, $RhCl_2$, $PdCl_2$, $PtCl_2$, etc.

Preferable of these catalysts are chlorides of Group II metals such as $BeCl_2$, $MgCl_2$ and $ZnCl_2$, of Group IV metals such as $SnCl_2$, of Group V metals such as $VCl_2$, of Group VI metals such as $CrCl_2$, of Group VII metals such as $MnCl_2$ and of Group VIII metals such as $CoCl_2$ and $NiCl_2$. More preferable are chlorides of Group II metals such as $MgCl_2$ and $ZnCl_2$, of group IV metals such as $SnCl_2$, of Group VII metals such as $MnCl_2$ and of Group VIII metals such as $CoCl_2$ and $NiCl_2$.

(b) Organic acid salts of bivalent metals

Useful bivalent metals are those in Groups II to VIII of the Periodic Table, of which preferable are Group II metals such as Mg and Zn, Group IV metals such as Sn, Group VII metals such as Mn, and Group VIII metals such as Co and Ni. Useful organic acids are mono- to tri-valent aliphatic or aromatic carboxylic acids which may have a hydroxyl group, an amino group and like substituents. Suitable aliphatic carboxylic acids are those having 1 to 24 carbon atoms, preferably 2 to 18 carbon atoms, such as acetic acid, propionic acid, lauric acid, caprylic acid, stearic acid, oleic acid, oxalic acid, succinic acid, citric acid, lactic acid, L-aspartic acid, etc. Suitable aromatic carboxylic acids are those having 7 to 15 carbon atoms, preferably 7 to 10 carbon atoms, such as benzoic acid, salicylic acid, terephthalic acid, etc. When such organic acid salts of bivalent metals (b) are used as the catalyst, the product contains about 3 to about 5% more trimer than when the bivalent metal chlorides (a) are used.

For the first step, ammonium chloride and phosphorus pentachloride are reacted with heating in the inert organic solvent in the presence of a specific catalyst. It is desirable to use an excess of ammonium chloride relative to phosphorus pentachloride. Usually about 1 to about 3 moles, preferably about 1 to about 1.5 moles of ammonium chloride is used per mole of phosphorus pentachloride. The catalyst is used in a usual catalytic amount. Generally about 1 to about $10^{-5}$ mole, preferably about $10^{-2}$ to about $10^{-4}$ mole, of the catalyst is used per mole of phosphorus pentachloride. The phosphorus pentachloride used may be the one prepared by the reaction of phosphorus trichloride and chlorine. The reaction can be conducted by various methods, for example, by adding ammonium chloride and the catalyst to the inert organic solvent, and dropwise adding a solution of phosphorus pentachloride in an organic solvent to the mixture with stirring. The latter organic solvent is preferably the same solvent as the former inert solvent. Although not particularly limited, the reaction temperature is usually about 100° to about 200° C., preferably about 120° to about 145° C. The reaction between phosphorus pentachloride and ammonium chloride is completed when evolution of hydrogen chloride gas is ceased. The excess of ammonium chloride is thereafter filtered off from the reaction mixture, and the solvent is distilled off from the filtrate to afford a reaction product consisting essentially of cyclic PNC oligomers. The reaction product thus obtained from the first step of this invention consists essentially of cyclic phosphonitrilic chloride oligomers represented by the formula $(PNCl_2)_n$ wherein n is an integer of 3 to 7, and is substantially free from other compounds such as linear phosphazene oligomers. Even if such impurities are present, the amount thereof is less than 1% by weight, preferably 0.5% by weight. When the reaction product resulting from the first step of the invention does not consist essentially of desired oligomers in this sense, for example, when the product contains a large quantity of linear phosphazene oligomers and other impurities which inhibit polymerization, it is impossible to efficiently recover the desired PNC oligomers of outstanding polymerization properties in the subsequent second step. It is therefore critical that the first step give a reaction product which consists essentially of the desired cyclic PNC oligomers. Accordingly it is essential to use, as a catalyst, at least one of (a) chlorides of bivalent metals and (b) organic acid salts of bivalent metals for preparing the reaction product of the first step.

Subsequently the reaction product is dissolved in at least one solvent selected from the group consisting of aliphatic hydrocarbons and ethers. Useful aliphatic hydrocarbons are straight-chain or branched-chain saturated hydrocarbons having 5 to 12 carbon atoms, such as petroleum ether, petroleum benzine, ligroin, n-hexane, n-heptane, n-octane, isooctane, etc. Useful ethers are dialkyl ethers having the same or different straight-chain or branched-chain alkyl groups having 2 to 4 carbon atoms, such as dibutyl ether, butyl ethyl ether, etc. The amount of the solvent to be used, which is not particularly limited and may be determined suitably, is usually one to three times, preferably one to two times, the amount by weight of the reaction product. The solution is brought into contact with water at a temperature of about 40° to about 100° C., preferably about 50° to 95° C., most preferably about 70° to about 90° C. Generally PNC oligomers are considered unstable in water, and the use of water for purifying the PNC oligomers have failed to achieve high PNC oligomer recovery ratio as is the case with the prior art described. Nevertheless the present invention unexpectedly achieves exceedingly high PNC oligomer recovery ratios although the solution is contacted with water at a relatively high temperature.

After the solution has been contacted or washed with water, the resulting aqueous layer is separated and removed from the organic layer. The solvent is then distilled off from the organic layer, and the residue is subjected to distillation, sublimation, recrystallization or like usual treatment to isolate a PNC oligomer mixture consisting essentially of the desired trimer and tetramer. The PNC oligomer mixture thus isolated usually contains at least about 90% by weight, preferably at least about 95% by weight, of the trimer and tetramer, and a small amount of the pentamer, hexamer and heptamer. Since generally the pentamer, hexamer and heptamer compounds are polymerizable only at high temperatures, the smaller the content thereof, the more preferable.

The process described above provides high yields of PNC oligomers having outstanding polymerization properties to give phosphazene polymers of excellent properties with good reproducibility.

The PNC oligomers prepared by the present process can be polymerized by various known methods, for example, by bulk polymerization or solution polymerization, whereby phosphazene polymers having high degrees of polymerization and a narrow molecular weight distribution can be obtained without entailing coloring or substantial formation of gel. Moreover polymers of such outstanding properties can be prepared with high reproducibility.

The invention will be described with reference to the following examples, in which the percentages are all by weight. The intrinsic viscosity, number average molecular weight ($\overline{Mn}$) and weight average molecular weight ($\overline{Mw}$) of the polymers obtained are determined by the following methods.

1. Intrinsic viscosity

Solution viscosities of the polymer are measured with use of dilution viscometer and intrinsic viscosity is calculated from the solution viscosities.

2. Number average molecular weight ($\overline{Mn}$)

Measured with use of a membrane osmometer.

3. Weight average molecular weight ($\overline{Mw}$)

Measured with use of the light scattering method.

EXAMPLE 1

Into a 3-liter three-necked flask equipped with a stirrer, condenser tube and dropping funnel are placed 231 g (4.3 moles) of ammonium chloride, 2.6 g ($2 \times 10^{-2}$ mole) of cobalt chloride $CoCl_2$ as a chloride of Group VIII metal and 350 g of 1,1,2,2-tetrachloroethane, and then 1650 g of 1,1,2,2-tetrachloroethane solution of 750 g (3.6 moles) of phosphorus pentachloride is added dropwise to the mixture at a temperature of 125° to 135° C. over a period of 16 hours. The resulting mixture is reacted for 2 hours after the completion of dropwise addition. After the reaction is completed, the unreacted ammonium chloride is filtered off from the reaction mixture, and the solvent is distilled off, giving 388.0 g of a reaction product (in a yield of 93.0% relative to the phosphorus pentachloride). Analysis by gas chromatography shows that the product is composed of 65.8% of trimer, 19.3% of tetramer and 14.9% of pentamer to heptamer, i.e. 100% of cyclic oligomers.

The product is dissolved in 570 g of n-heptane, and the solution is washed with an equal amount of water at about 80° C., and the aqueous layer is separated off. By distilling n-heptane from the organic layer, 387.0 g of crude PNC oligomers are recovered (92.8% yield based on the phosphorus pentachloride, and 99.74% recovery ratio by washing with water). The product is gas-chromatographically found to be composed of 65.9% of trimer, 19.4% of tetramer and 14.7% of pentamer to heptamer. The crude oligomers thus recovered are distilled in a vacuum to afford 250 g of purified oligomers. Gas chromatography has shown that the product is composed of 96.0% of trimer and 4.0% of tetramer.

The purified oligomers are placed into a polymerizing tube, which is then evacuated to a pressure of $10^{-2}$ mm Hg and sealed, and the product is polymerized at 250° C. without entailing gelation, achieving 25% conversion in 21.5 hours. The polymer obtained is 1.68 dl/g in intrinsic viscosity, $4.15 \times 10^5$ in $\overline{Mn}$, $1.81 \times 10^6$ in $\overline{Mw}$ and 4.4 in $\overline{Mw}/\overline{Mn}$, hence showing satisfactory polymerization characteristics.

The first step, second step and polymerizing step are repeated 3 times, with the result that the polymers obtained are free from any color or gel and have substantially the same properties as above in respect of intrinsic viscosity, $\overline{Mn}$, $\overline{Mw}$ and $\overline{Mw}/\overline{Mn}$.

When the second step is repeated with use of petroleum ether, n-hexane, n-octane, isooctane, dibutyl ether or butyl ethyl ether in place of n-heptane, substantially the same results as above are attained.

EXAMPLE 2

Oligomers are prepared in the same manner as in Example 1 with the exception of using 2.52 g ($2 \times 10^{-2}$ mole) of manganese chloride, i.e. a chloride of Group VII metal, as the catalyst and monochlorobenzene as the inert solvent in the first step and using n-heptane as the solvent in the second step. The first step gives 380.1 g of a reaction product (91.1% yield based on the phosphorus pentachloride), which is gas-chromatographically found to be composed of 71.2% of trimer, 18.2% of tetramer and 10.6% of pentamer to heptamer, i.e. 100% of cyclic oligomers. In the second step, 379.0 g of crude PNC oligomers is recovered from the n-heptane solution washed with water (90.0% yield based on the phosphorus pentachloride, and 99.7% recovery ratio by washing with water). The crude product is distilled in a vacuum, giving 263.0 g of purified PNC oligomers (gas chromatographically 97.2% of trimer and 2.8% of tetramer).

The purified product is divided into 2 equal portions, which are each polymerized in the same manner as in Example 1, affording polymers free from any color or gel and achieving 25% conversion in 23 hours. The polymers obtained from the portions are all about 1.75 dl/g in intrinsic viscosity, about $4.27 \times 10^5$ in $\overline{M}n$, about $2.01 \times 10^6$ in $\overline{M}w$ and about 4.7 in $\overline{M}w/\overline{M}n$.

EXAMPLE 3

Oligomers are prepared in the same manner as in Example 2 with the exception of using 2.45 g ($2 \times 10^{-2}$ mole) of zinc chloride, i.e. a chloride of Group II metal, as the catalyst in the first step. The process gives 387.1 g of a reaction product (92.8% yield based on the phosphorus pentachloride), which is gas-chromatographically found to be composed of 56.2% of trimer, 26.4% of tetramer and 17.4% of pentamer to heptamer, i.e. 100% of cyclic oligomers. In the second step, 386.0 g of crude PNC oligomers is recovered from the n-heptane solution washed with water (92.6% yield based on the phosphorus pentachloride, and 99.7% recovery ratio by washing with water). The crude mixture of PNC oligomers is distilled, giving 200.2 g of purified PNC oligomers (gas-chromatographically 94.5% of trimer, 5.2% of tetramer and 0.3% of pentamer). The pure PNC oligomers are checked for polymerization properties in the same manner as in Example 1, giving a polymer free from any color or gel and achieving 25% conversion in 45 hours. The polymer is 0.941 dl/g in intrinsic viscosity, $3.24 \times 10^5$ in $\overline{M}n$, $8.96 \times 10^5$ in $\overline{M}w$ and 2.8 in $\overline{M}w/\overline{M}n$, hence satisfactory properties.

The above procedure is repeated 3 times, with the result that the polymers obtained all have substantially the same properties as above.

EXAMPLES 4 TO 8

PNC oligomers are prepared in the same manner as in Example 1 with the exception of using a chloride of Group VIII metal, namely $NiCl_2$, a chloride of Group VI metal, namely $CrCl_2$, a chloride of Group V metal, namely $VCl_2$, a chloride of Group IV metal, namely $SnCl_2$, or a chloride of Group II metal, namely $MgCl_2$, in an amount of $2 \times 10^{-2}$ mole as the catalyst, and further using monochlorobenzene as the inert solvent in the first step and using n-heptane as the solvent in the second step. Table 1 shows the results.

When the above procedure is repeated 3 times for each of the Examples, the polymers obtained are all free from any gel or color.

TABLE 1

| Example Catalyst | 4 $NiCl_2$ | 5 $CrCl_2$ | 6 $VCl_2$ | 7 $SnCl_2$ | 8 $MgCl_2$ |
|---|---|---|---|---|---|
| Reaction product (%)* | | | | | |
| Yield | 85.6 | 84.3 | 86.0 | 82.8 | 91.4 |
| Trimer | 69.3 | 61.4 | 70.2 | 73.7 | 69.0 |
| Tetramer | 14.0 | 17.3 | 13.4 | 11.4 | 19.0 |
| Pentamer to heptamer | 16.7 | 21.3 | 16.4 | 14.9 | 12.0 |
| Recovery (%)** | 99.3 | 98.9 | 99.3 | 99.6 | 99.7 |
| Crude oligomer yield (%)* | 85.0 | 83.4 | 85.0 | 82.5 | 91.1 |
| Purified oligomers (%) | | | | | |
| Trimer | 93.5 | 81.6 | 85.3 | 86.4 | 85.1 |
| Tetramer | 6.4 | 17.1 | 11.5 | 10.2 | 10.2 |
| Pentamer | 0.1 | 1.3 | 3.2 | 3.4 | 4.7 |
| Polymerization properties*** | | | | | |

TABLE 1-continued

| Example Catalyst | 4 $NiCl_2$ | 5 $CrCl_2$ | 6 $VCl_2$ | 7 $SnCl_2$ | 8 $MgCl_2$ |
|---|---|---|---|---|---|
| Gelation | None | None | None | None | None |
| Coloring | None | None | None | None | None |

*The reaction product and crude product are gas-chromatographically found to be composed of 100% cyclic oligomers.
**Ratio of recovery by washing with water.
***Properties of the pure product when it is subjected to bulk polymerization at 250° C. for 24 hours.

EXAMPLE 9

Into a 3-liter three-necked flask equipped with a stirrer, condenser tube and dropping funnel are placed 231 g (4.3 moles) of ammonium chloride, 3.67 g ($2 \times 10^{-2}$ mole) of zinc acetate $Zn(CH_3COO)_2$ as an organic acid salt of Group II metal and 350 g of monochlorobenzene, and then 1650 g of monochlorobenzene solution containing 750 g (3.6 moles) of phosphorus pentachloride is added dropwise to the mixture at a temperature of 125° to 135° C. over a period of 16 hours. The resulting mixture is reacted for 2 hours after the completion of dropwise addition. After the reaction is completed, the unreacted ammonium chloride is filtered off from the reaction mixture, and the solvent is distilled off, giving 375.9 g of a reaction product (in a yield of 90.1% relative to the phosphorus pentachloride). Gas chromatography shows that the product is composed of 59.9% of trimer, 24.1% of tetramer and 16.0% of pentamer to heptamer, i.e. 100% of cyclic oligomers.

The product is dissolved in 570 g of n-heptane, the solution washed with an equal amount of water at about 80° C., and the aqueous layer separated off. The n-heptane layer gives 375.1 g of crude oligomers (89.9% yield based on the phosphorus pentachloride, and 99.79% recovery ratio by washing with water). The product is gas-chromatographically found to be composed of 60.0% of trimer, 24.1% of tetramer and 15.9% of pentamer to heptamer. The crude PNC oligomers thus obtained are distilled in a vacuum to afford 199.0 g of purified oligomers. Gas chromatograhic analysis has shown that the product is composed of 98.6% of trimer and 1.4% of tetramer.

The purified oligomers are placed into a polymerizing tube, which is then evacuated to a pressure of $10^{-2}$ mm Hg and sealed, and the product is polymerized at 250° C. without entailing gelation and discoloration, achieving 25% conversion in 28 hours. The polymer obtained is 1.02 dl/g in intrinsic viscosity, $3.53 \times 10^5$ in $\overline{M}n$, $9.97 \times 10^5$ in $\overline{M}w$ and 2.8 in $\overline{M}w/\overline{M}n$, hence satisfactory polymerization properties.

The first step, second step and polymerizing step are repeated 3 times, with the result that the polymers obtained are free from any color or gel and have substantially the same properties as above in respect of intrinsic viscosity, $\overline{M}n$, $\overline{M}w$ and $\overline{M}w/\overline{M}n$.

When the second step is repeated with use of petroleum ether, n-hexane, n-octane, dibutyl ether or butyl ethyl ether in place of n-heptane, substantially the same results as above are attained.

EXAMPLE 10

PNC oligomers are prepared in the same manner as in Example 9 with the exception of using 2.8 g ($2 \times 10^{-2}$ mole) of manganese acetate as the catalyst in the first step. The first step gives 376.4 g of a reaction product (90.2% yield based on the phosphorus pentachloride), which is gas-chromatographically found to be composed of 71.2% of trimer, 17.0% of tetramer and 11.8% of pentamer to heptamer, i.e. 100% of cyclic oligomers. In the second step, 375.3 g of crude PNC oligomers are recovered from the n-heptane solution washed with water (89.9% yield based on the phosphorus pentachloride, and 99.7% recovery ratio by washing with water). The crude product is distilled in a vacuum, giving 282.5 g of purified oligomers (gas-chromatographically 87.1% of trimer, 11.2% of tetramer and 1.8% of pentamer).

The purified product is divided into 2 equal portions, which are each polymerized in the same manner as in Example 1, affording polymers free from any color or gel and achieving 25% conversion in 22.5 hours. The polymers obtained from the portions are all about 1.45 dl/g in intrinsic viscosity, about $4.1 \times 10^5$ in $\overline{M}n$, about $2.2 \times 10^6$ in $\overline{M}w$ and about 5.4 in $\overline{M}w/\overline{M}n$.

EXAMPLE 11

PNC oligomers are prepared in the same manner as in Example 9 with the exception of using 12.4 g ($2 \times 10^{-2}$ mole) of cobalt stearate, $Co(C_{17}H_{35}COO)_2$, as the catalyst and 1,1,2,2-tetrachloroethane as the solvent in the first step. The first step gives 385.0 g of a reaction product (92.3% yield based on the phosphorus pentachloride), which is gas-chromatographically found to be composed of 70.2% of trimer, 17.2% of tetramer and 12.5% of pentamer to heptamer, i.e. 100% of cyclic oligomers. In the second step, 383.0 g of crude oligomers is recovered from the n-heptane solution washed with water (91.8% yield based on the phosphorus pentachloride, and 99.48% recovery ratio by washing with water). The crude product is distilled, giving 255.7 g of purified PNC oligomers (gas-chromatographically 97.1% of trimer, and 2.9% of tetramer). The pure product is checked for polymerization properties in the same manner as in Example 9, giving a polymer free from any color or gel and achieving 25% conversion in 22 hours. The polymer is 1.70 dl/g in intrinsic viscosity, $5.27 \times 10^5$ in $\overline{M}n$, $2.64 \times 10^6$ in $\overline{M}w$ and 5.0 in $\overline{M}w/\overline{M}n$, hence satisfactory properties.

The above procedure is repeated 3 times, with the result that the polymers obtained are free from any color or gel and have substantially the same properties as above.

EXAMPLES 12 TO 18

PNC oligomers are prepared in the same manner as in Example 9 with the exception of using magnesium stearate $[Mg(C_{17}H_{35}COO)_2]$, mangesium benzoate $[Mg(C_6H_5COO)_2]$, magnesium L-asparaginate $[Mg(C_4H_6NO_4)_2]$, nickel oxalate $[NiC_2O_4]$, magnesium succinate $[Mg(C_2H_2O_2)_2]$, manganese succinate $[Mn(C_2H_2O_2)_2]$, and and magnesium citrate $[Mg_3(C_6H_5O_7)_2]$ in an amount of $2 \times 10^{-2}$ mole as the catalyst in the first step and using n-heptane as the solvent in the second step. Table 2 shows the results.

When the above procedure is repeated 3 times for each of the Examples, the polymers obtained are all free from any gel or color.

TABLE 2

| Example | 12 | 13 | 14 | 15 | 16 | 17 | 18 |
|---|---|---|---|---|---|---|---|
| Catalyst | $Mg(C_{17}H_{35}COO)_2$ | $Mg(C_6H_5COO)_2$ | $Mg(C_4H_6NO_4)_2$ | $NiC_2O_4$ | $Mg(C_2H_2O_2)_2$ | $Mn(C_2H_2O_2)_2$ | $Mg_3(C_6H_5O_7)_2$ |
| Reaction product (%)* | | | | | | | |
| Yield | 89.8 | 90.1 | 89.6 | 91.2 | 88.8 | 90.2 | 88.5 |
| Trimer | 72.0 | 73.1 | 73.8 | 72.5 | 73.4 | 74.8 | 74.0 |
| Tetramer | 17.2 | 16.5 | 15.0 | 16.9 | 15.6 | 14.7 | 16.1 |
| Pentamer to heptamer | 10.8 | 10.4 | 11.2 | 10.6 | 11.0 | 10.5 | 9.9 |
| Recovery (%)** | 99.6 | 99.5 | 99.5 | 98.8 | 99.6 | 99.3 | 99.7 |
| Crude oligomer yield (%)* | 89.4 | 89.6 | 89.1 | 90.1 | 88.4 | 89.6 | 88.2 |
| Purified oligomers (%) | | | | | | | |
| Trimer | 97.5 | 98.2 | 98.5 | 81.3 | 84.4 | 83.7 | 85.8 |
| Tetramer | 2.5 | 1.8 | 1.5 | 17.1 | 14.2 | 15.6 | 13.2 |
| Pentamer | — | — | — | 1.6 | 1.4 | 0.7 | 1.0 |
| Polymerization properties*** | | | | | | | |
| Gelation | None | None | None | None | None | None | None |
| Coloring | None | None | None | None | None | None | None |

*The reaction product and crude product are gas-chromatographically found to be composed of 100% cyclic oligomers.
**Ratio of recovery by washing with water.
***Properties of the pure product when it is subjected to bulk polymerization at 250° C. for 24 hours.

COMPARISON EXAMPLE 1

First step is repeated in the same manner as in Example 1 except that no catalyst is used. 371.3 g of a reaction product (in a yield of 89.0% relative to phosphorus pentachloride) is obtained. Analysis shows that the product is composed of 71.5% of cyclic PNC oligomers (which consist of 80.5% of trimer, 10.1% of tetramer and 9.4% of pentamer to heptamer) and 28.5% of linear compounds and other impurities.

By conducting the second step in the same manner as in Example 1, 238.9 g of crude PNC oligomers is recovered after washing with water (64.3% recovery ratio). The recovered product is gas-chromatographically found to be composed of 82.0% of trimer, 10.5% of tetramer and 7.5% of pentamer to heptamer. The crude oligomers thus obtained are distilled in a vacuum to give 200 g of purified PNC oligomers (gas-chromatographically 95.5% of trimer, 4.2% of tetramer and 0.3% of pentamer).

The purified PNC oligomers are subjected to polymerization in the same manner as in Example 1. However the polymer obtained is seriously discolored.

The same procedure as above is repeated several times, but the purified PNC oligomers sometimes failed to polymerize. Even when the purified PNC oligomers give polymer, the polymer becomes colored black.

COMPARISON EXAMPLE 2

A reaction product (388.0 g) obtained in the same manner as in the first step of Example 1 is dissolved in 570 g of toluene and the solution is washed with an equal amount of water at about 80° C., and the aqueous layer is separated off. From the toluene layer, 360.8 g of crude PNC oligomers are recovered (93.0% recovery ratio). The crude PNC oligomers thus recovered are vacuum distilled to afford 245 g of purified PNC oligomers which is found to be composed of 97.1% of trimer and 2.9% of tetramer.

The purified PNC oligomers are subjected to polymerization in the same manner as Example 1. However, the polymer obtained becomes colored dark brown.

COMPARISON EXAMPLE 3

A reaction product (388.0 g) obtained in the same manner as in the first step of Example 1 is purified by vacuum distillation without conducting the second step. The purified PNC oligomers thus obtained (243 g) is found by gas-chromatographic analysis to be composed of 97.9% of trimer and 2.1% of tetramer.

The purified PNC oligomers are subjected to polymerization in the same manner as in Example 1. However the polymer undergoes gelation about 20 minutes after the initiation of the polymerization and the polymer becomes colored black.

We claim:

1. A process for preparing cyclic phosphonitrillic chloride oligomers characterized by the combination of: the first step of reacting phosphorous pentachloride with ammonium chloride in an inert organic solvent in the presence of a catalyst comprising at least one of (a) chlorides of bivalent metals and (b) organic acid salts of bivalent metals, the second step of distilling off the solvent from the resulting reaction mixture to obtain a reaction product consisting essentially of cyclic phosphonitrilic chloride oligomers, the third step of contacting a solution of the reaction product in at least one solvent selected from the group consisting of aliphatic hydrocarbons and ethers with water at a temperature of about 40° to about 100° C., and the fourth step of separating the resulting aqueous layer from the organic layer, and isolating from the organic layer a mixture of cyclic phosphonitrilic chloride oligomers having outstanding polymerization properties and consisting essentially of the trimer and tetramer of the phosphonitrilic chloride.

2. A process as defined in claim 1 wherein the inert organic solvent is a straight-chain or branched-chain chlorinated hydrocarbon having 2 to 4 carbon atoms or a chlorobenzene.

3. A process as defined in claim 1 wherein the chlorides of bivalent metals are chlorides of bivalent metals in Groups II to VIII of the Periodic Table.

4. A process as defined in claim 3 wherein the chlorides of bivalent metals are chlorides of metals in Group II of the Periodic Table including $BeCl_2$, $MgCl_2$, $CaCl_2$, $SrCl_2$, $BaCl_2$, $ZnCl_2$ and $CdCl_2$.

5. A process as defined in claim 3 wherein the chlorides of bivalent metals are chlorides of metals in Group III of the Periodic Table including $GaCl_2$.

6. A process as defined in claim 3 wherein the chlorides of bivalent metals are chlorides of metals in Group IV of the Periodic Table including $TiCl_2$, $SnCl_2$ and $PbCl_2$.

7. A process as defined in claim 3 wherein the chlorides of bivalent metals are chlorides of metals in Group V of the Periodic Table including $VCl_2$ and $NbCl_2$.

8. A process as defined in claim 3 wherein the chlorides of bivalent metals are chlorides of metals in Group VI of the Periodic Table including $CrCl_2$ and $MoCl_2$.

9. A process as defined in claim 3 wherein the chlorides of bivalent metals are chlorides of metals in Group VII of the Periodic Table including $MnCl_2$.

10. A process as defined in claim 3 wherein the chlorides of bivalent metals are chlorides of metals in Group VIII of the Periodic Table including $FeCl_2$, $CoCl_2$, $NiCl_2$, $RhCl_2$, $PdCl_2$ and $PtCl_2$.

11. A process as defined in claim 3 wherein the chlorides of bivalent metals are chlorides of metals in Groups II, IV, V, VI, VII, and VIII of the Periodic Table.

12. A process as defined in claim 11 wherein the chlorides of bivalent metals are selected from the group consisting of $BeCl_2$, $MgCl_2$, $ZnCl_2$, $SnCl_2$, $VCl_2$, $CrCl_2$, $MnCl_2$, $CoCl_2$ and $NiCl_2$.

13. A process as defined in claim 11 wherein the chlorides of bivalent metals are selected from the group consisting of chlorides of metals in Groups II, IV, VII and VIII of the Periodic Table.

14. A process as defined in claim 13 wherein the chlorides of bivalent metals are selected from the group consisting of $MgCl_2$, $ZnCl_2$, $SnCl_2$, $MnCl_2$, $CoCl_2$ and $NiCl_2$.

15. A process as defined in claim 1 wherein the organic acid salts of bivalent metals are selected from the group consisting of organic acid salts of metals in Groups II, IV, VII and VIII of the Periodic Table.

16. A process as defined in claim 13 wherein the organic acid salts of bivalent metals are selected from the group consisting of organic acid salts of Mg, Zn, Sn, Mn, Co, Ni.

17. A process as defined in claim 1 wherein the organic acid is a mono- to tri-valent aliphatic or aromatic carboxylic acids with or without substituents.

18. A process as defined in claim 17 wherein the aliphatic carboxylic acids have 1 to 24 carbon atoms.

19. A process as defined in claim 18 wherein the aliphatic carboxylic acids have 2 to 18 carbon atoms.

20. A process as defined in claim 17 wherein the aromatic carboxylic acids have 7 to 15 carbon atoms.

21. A process as defined in claim 20 wherein the aromatic carboxylic acids have 7 to 10 carbon atoms.

22. A process as defined in claim 1 wherein about 1 to about $10^{-5}$ mole of the catalyst is used per mole of phosphorus pentachloride.

23. A process as defined in claim 22 wherein about $10^{-2}$ to about $10^{-4}$ mole of the catalyst is used per mole of phosphorus pentachloride.

24. A process as defined in claim 1 wherein an excess of ammonium chloride is used relative to phosphorus pentachloride.

25. A process as defined in claim 24 wherein about 1 to about 3 moles of ammonium chloride is used per mole of phosphorus pentachloride.

26. A process as defined in claim 1 wherein the reaction of the first step is conducted at a temperature of about 100° to about 200° C.

27. A process as defined in claim 26 wherein the reaction of the first step is conducted at a temperature of about 120° to about 145° C.

28. A process as defined in claim 1 wherein the aliphatic hydrocarbons are straight-chain or branched-chain saturated hydrocarbons having 5 to 12 carbon atoms.

29. A process as defined in claim 1 wherein the ethers are dialkyl ethers containing the same or different alkyl groups having 2 to 4 carbon atoms.

30. A process as defined in claim 1 wherein the reaction product is dissolved in the solvent in one to three times the amount by weight of the reaction product in the second step.

31. A process as defined in claim 1 wherein the solution is contacted with water at a temperature of 50° to 95° C.

32. A process as defined in claim 31 wherein the solution is contacted with water at a temperature of 70° to 90° C.

33. A process as defined in claim 1 wherein the mixture of cyclic phosphonitrilic chloride oligomers isolated in the fourth step contains at least about 90% by weight of the trimer and tetramer.

34. A process as defined in claim 1 wherein the mixture of cyclic phosphonitrilic chloride oligomers isolated in the fourth step contains at least about 95% by weight of the trimer and tetramer.

* * * * *